US005079625A

United States Patent [19]

Kitamura et al.

[11] Patent Number: 5,079,625

[45] Date of Patent: Jan. 7, 1992

[54] IMAGE EDITING APPARATUS FOR EDITING A DESIGNATED AREA OF AN ORIGINAL IMAGE

[75] Inventors: Toshiyuki Kitamura, Kawasaki; Yasumichi Suzuki, Yamayoshibiru, both of Japan

[73] Assignee: Canon Kabushiki Kaisha, Tokyo, Japan

[21] Appl. No.: 436,025

[22] Filed: Nov. 14, 1989

[30] Foreign Application Priority Data

Nov. 14, 1988 [JP] Japan ............................... 63-287097

[51] Int. Cl.[5] ............................................. H04N 1/40
[52] U.S. Cl. ..................................................... 358/75
[58] Field of Search .................................. 358/75, 80

[56] References Cited

U.S. PATENT DOCUMENTS 4,873,570 10/1989 Suzuki et al. ......................... 358/80

FOREIGN PATENT DOCUMENTS 291000 11/1988 European Pat. Off. .
662686 10/1987 Switzerland .
2174568A 11/1986 United Kingdom .
2194117A 2/1988 United Kingdom .

*Primary Examiner*—Kenneth A. Wieder
*Assistant Examiner*—Glenn W. Brown
*Attorney, Agent, or Firm*—Fitzpatrick, Cella, Harper & Scinto

[57] ABSTRACT

There are provided an image editing method and apparatus for designating a desired area of an original image and executing the image processing. The apparatus comprises: a point pen to designate a desired area of the original; a first designating device, to designate a processing mode for the image of the area designated by the point pen; an LCD to display the area designated by the point pen; a controller for displaying a plurality of areas designated by the point pen on the LCD and for designating the same processing mode for those areas at once by means of the designating device; and another designating device to designate the processing mode for the images for areas other than the areas designated by the point pen. The LCD graphically displays the areas designated by the point pen. The designating device designates the mode regarding a color. With the apparatus, a plurality of areas can be continuously designated every processing mode and the area and the processing mode can be smoothly designated.

20 Claims, 11 Drawing Sheets

IMAGE EDITING APPARATUS FOR EDITING A DESIGNATED AREA OF AN ORIGINAL IMAGE

BACKGROUND OF THE INVENTION

1. Field of the Invention

The present invention relates to an image editing apparatus for designating a desired area of an image and executing an image editing.

2. Related Background Art

Hitherto, in an image editing apparatus in which a desired area of an original is designated and a processing for the desired area is designated, there has been used a designating procedure in which, after one set of coordinate values of the area are input, the processing for the area is selected and numerical values for the processing are input.

However, in recent years, in association with the improvement of the processing speed of the electronic processing apparatus or an increase in capacity of an internal memory device, the number of areas which can be processed can also be remarkably increased, as shown in, for instance, U.S. Pat. No. 4,873,520. However, in the above conventional example, in the case of designating a desired area of an image in which the same kind of many processing areas exist, the same operation must be repeated many times, so that the efficiency is very low.

On the other hand, when the number of areas which are to be subjected to the same processing increases, there is a case where the operator forgets which area was input, so that it is difficult to smoothly designate all the appropriate information.

SUMMARY OF THE INVENTION

It is an object of the present invention to provide an image editing apparatus which can eliminate the foregoing drawbacks.

Another object of the invention is to provide an image editing apparatus in which a plurality of areas can be continuously designated for every processing mode, and the area and the processing mode can be smoothly designated.

Still another object of the invention is to provide an image editing apparatus in which a plurality of areas are displayed every processing mode, and the area and the processing mode can be smoothly designated.

The above and other objects and features of the present invention will become apparent from the following detailed description and taken with reference to the accompanying drawings.

DETAILED DESCRIPTION OF PREFERRED EMBODIMENTS

Figure 1:
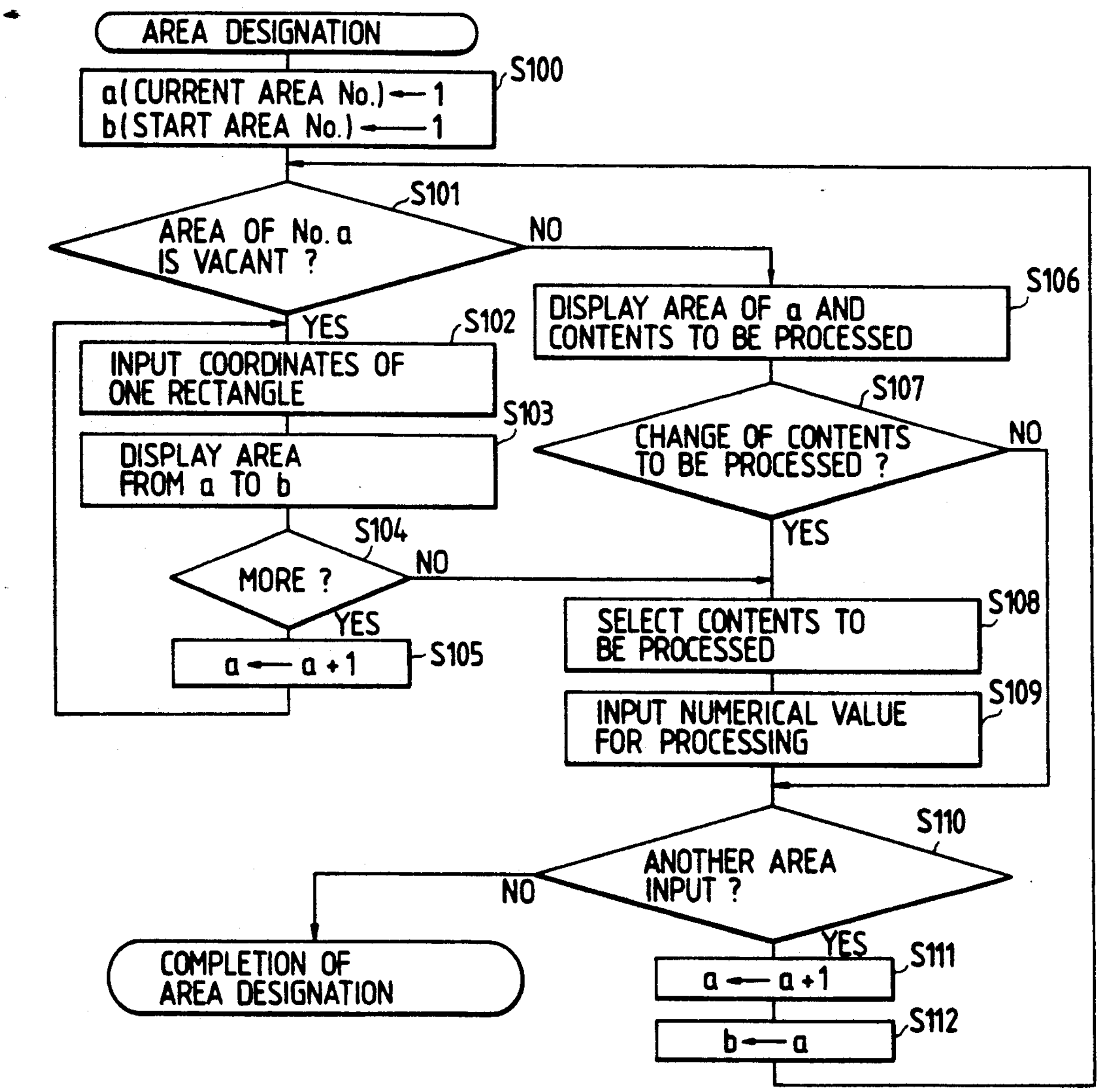
FIG. 1 is a flowchart showing the first embodiment of an algorithm to designate a plurality of same-processing areas in a lump.

The present invention will be described hereinbelow on the basis of an embodiment shown in the drawings.

Figure 2:
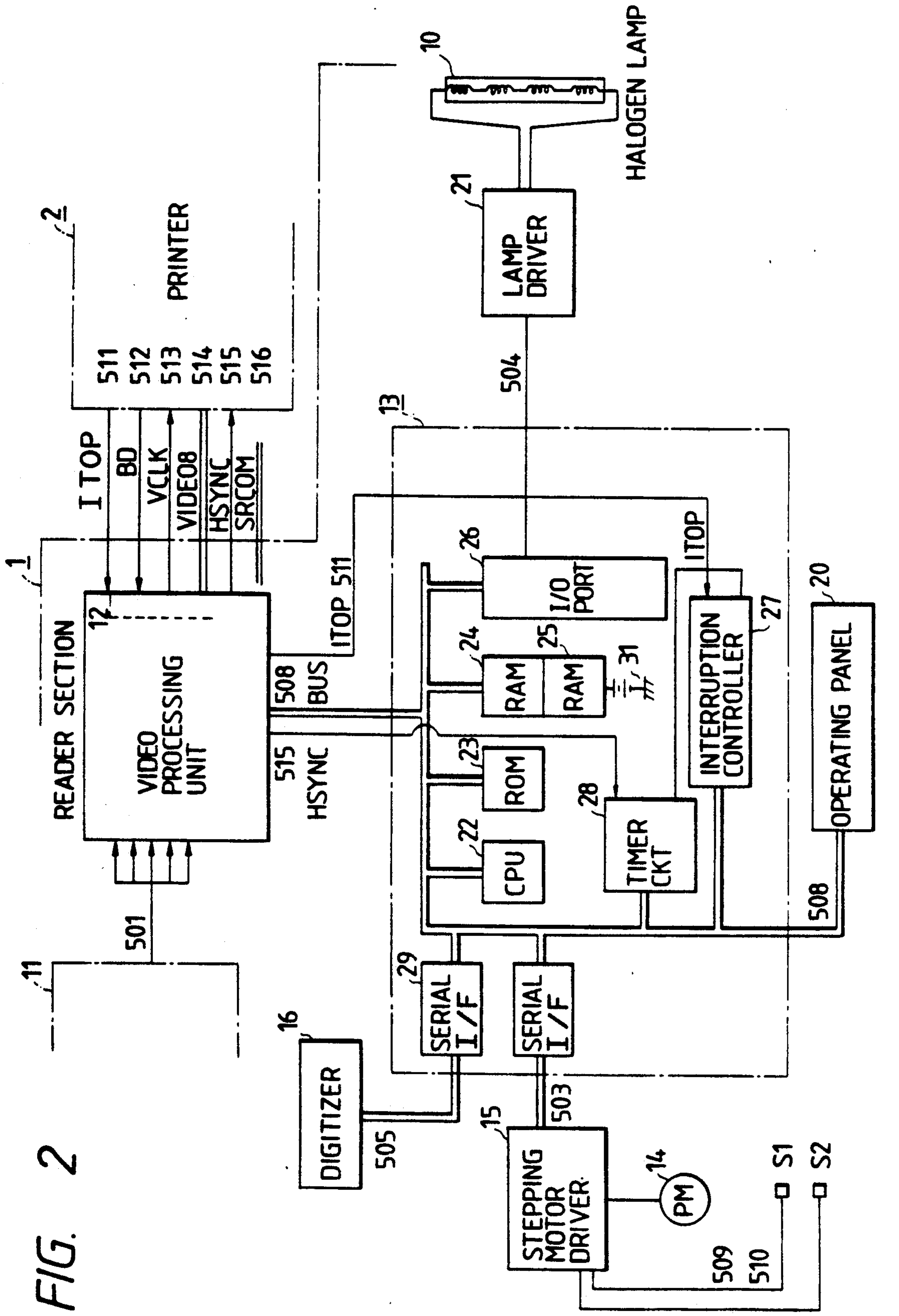
FIG. 2 is a block diagram of a whole image editing apparatus.

A control section 13 of a reader section according to the invention will be first described with reference to FIG. 2. The reader section is provided for reading a color original and dissolving into signals per color, thereby executing the image processing.

Control Section

A control section includes a CPU 22 as a microcomputer. In order to obtain a desired copy image, in accordance with data from a program ROM 23, an RAM 24, and an RAM 25, the control section controls a lamp driver 21, a stepping motor driver 15, a digitizer 16, and an operating panel 20 for video signal processing control, exposure, and scanning through signal lines 508 (bus), 504, 503, and 505 and the like. The RAM 25 is backed up by a battery 31 and its non-volatile property is guaranteed. Reference numeral 505 denotes the signal line for serial communication which is generally used. A protocol between the CPU 22 and the digitizer 16 is executed through the signal line 505. The signal line 505 is also used to input instructions to edit an original such as movement, area indication, copying mode indication, variable magnification indication, etc. The signal line 503 is used when the CPU 22 instructs the scanning speed, distance, going movement, return movement, etc. to the motor driver 15. In response to the instruction from the CPU 22, the motor driver 15 supplies predetermined pulses to the stepping motor 14, thereby giving the rotating operation of the motor. Serial interfaces I/F 29 and 30 are of the general types which are realized by serial I/F LSIs or the like such as 8251 made by Intel Co., Ltd. Although not shown, the digitizer 16 and motor driver 15 also have similar circuits.

$S_1$ and $S_2$ denote sensors to detect the position of an original exposing scanning unit (not shown). The sensor $S_1$ detects the home position of the exposing scanning unit and the white level of the image signal is corrected at the home position. The sensor $S_2$ detects that the original exposing scanning unit exists at the front edge of the image, and this position is set to the front edge reference position of the original.

Reference numeral 11 denotes a sensor to read the original image and a CCD is used. Reference numeral 12 indicates a video processing unit for dissolving the image signal sent from the sensor 11 by a signal line 501 into the color signals and the luminance signal, for executing various signal processings and image processings, and for outputting the digital image signals of the colors of magenta, cyan, yellow, and black to a printer 2. A signal ITOP is a sync signal in the image feeding direction (sub-scanning direction). Total four signals ITOP are generated every color and are transmitted from the printer 2 to the video processing unit 12 via a signal line 511. A signal BD is a sync signal in the raster scanning direction (main scanning direction). The signal BD is generated every rotation of a polygonal mirror (not shown) in the printer and is transmitted to the video processing unit via a signal line 512. A signal VCLK is a sync clock to transmit a 8-bit digital video signal VIDEO8 to the printer 2. The signal VCLK is sent to the printer via a signal line 513. The signal VIDEO8 is sent to the printer via a signal line 514. SRCOM indicates a signal line for bidirectional serial communication between the video processing unit 12 and the printer 2.

Figure 3:
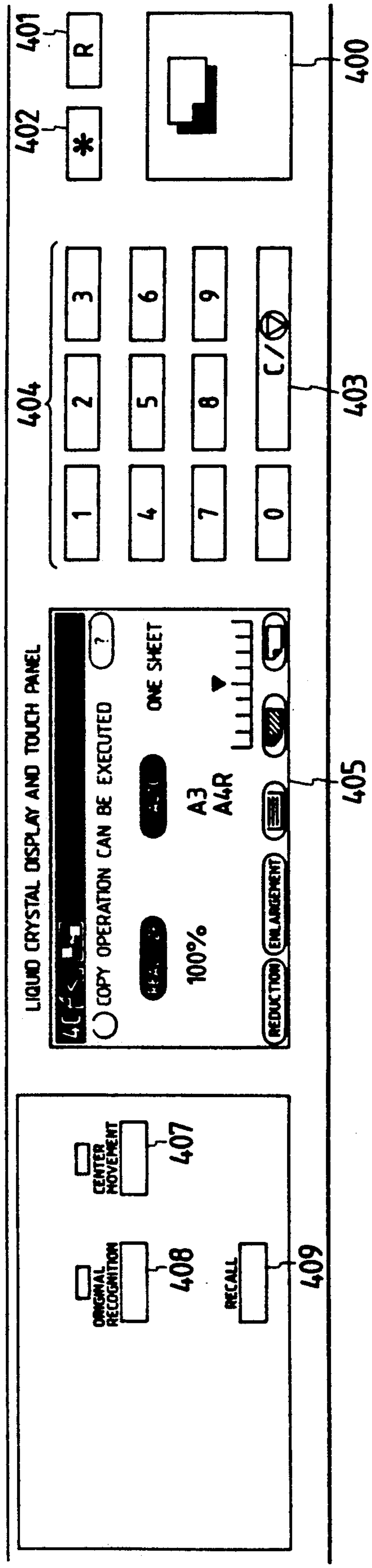
FIG. 3 is a diagram showing the concept of an operating section.

FIG. 3 is an explanatory diagram of the operating section of the image editing apparatus. Reference numeral 401 denotes a reset key to return the operating mode to a predetermined standard mode; 404 indicates a ten-key to input numerical values such as the number of sheets to be set or the like; 403 a clear/stop key to clear the registration and to stop the serial copying operation; and 405 a display section to display the operating mode which is set by a touch panel key or the state of the color printer 2. Reference numeral 407 denotes a center movement key to designate the center movement; 408 an original recognition key to designate the mode to automatically detect the size and position of the original upon copying; and 409 a recall key to recall the preceding copy setting mode.

Digitizer

Figure 4:
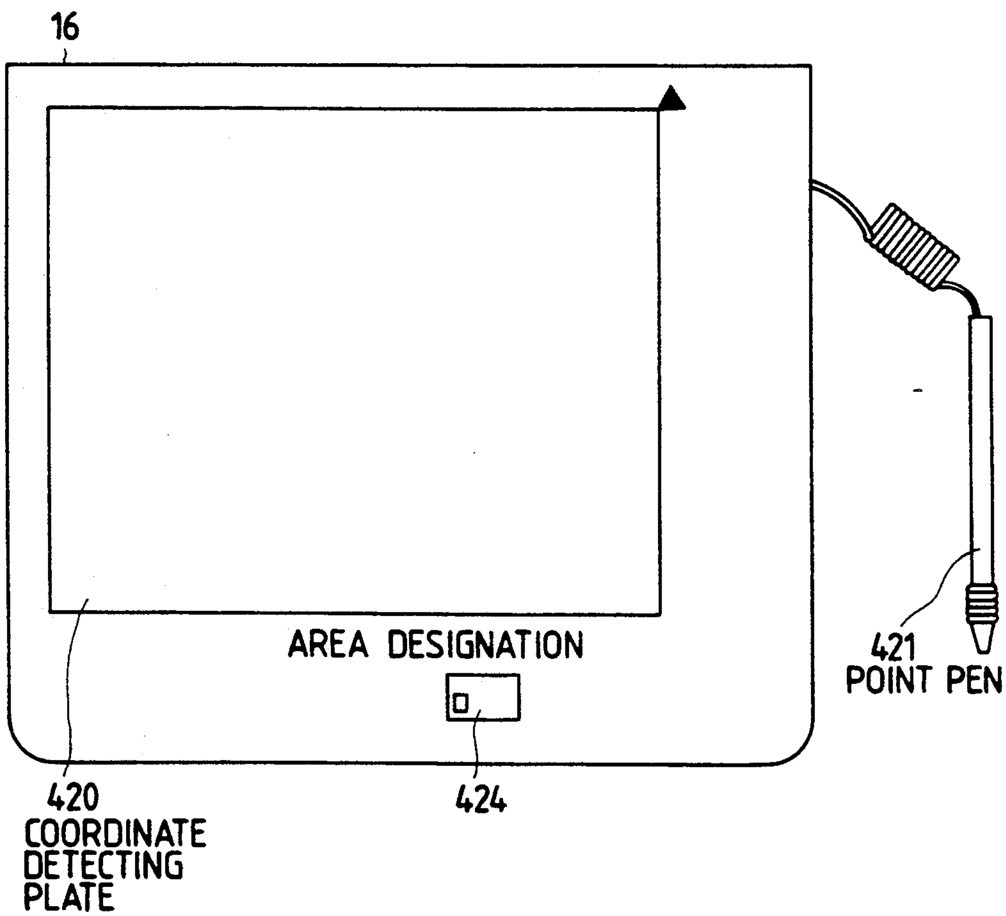
FIG. 4 is a diagram showing a digitizer.

FIG. 4 is an external view of the digitizer 16. Reference numeral 424 denotes an entry key to set an area designating mode; which will be explained hereinlater, 420 indicates a coordinate position detecting plate to designate an arbitrary area on the original; and 421 a point pen to designate the coordinates. The above key and coordinate input data are transmitted and received to/from the CPU 22 through the bus 505 and stored into the RAMs 24 and 25 in accordance with them.

Figure 5:
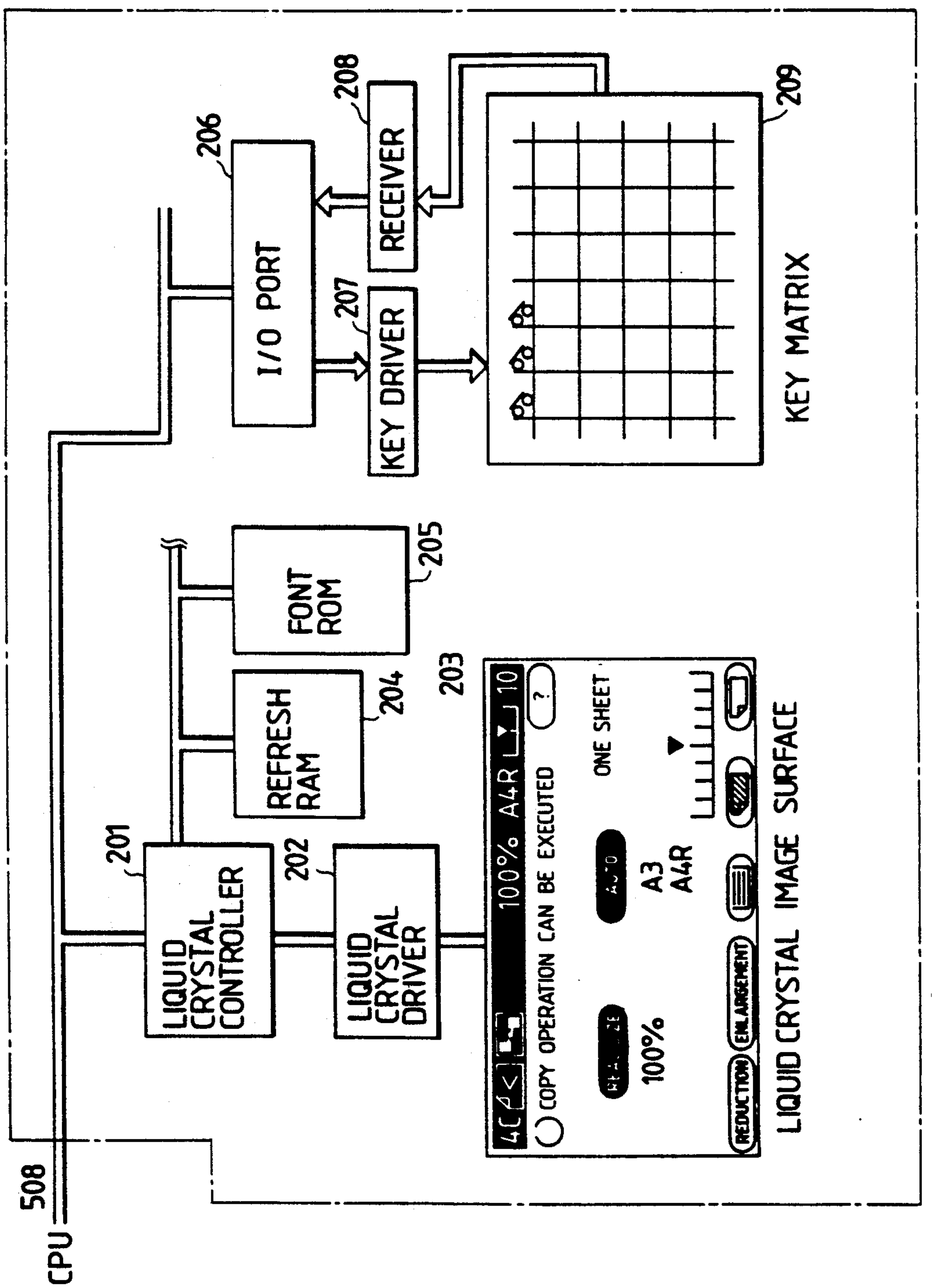
FIG. 5 is a block diagram of a liquid crystal display section and its peripheral components in the operating section.

FIG. 5 shows an operating panel section according to the invention, particularly, a control section of a liquid crystal image surface, and a key matrix 209. The operating panel is controlled by a command which is given through the bus 508 in FIG. 2 to an I/O port 206 for controlling a liquid crystal controller 201 in FIG. 5 and a key matrix 209 for key input and touch key input. Fonts which are displayed on the liquid crystal image surface are stored in a FONT ROM 205 and are sequentially transferred to a refresh RAM 204 in accordance with a program which is given from the CPU 22. The liquid crystal controller 201 sends the image surface data for display to a liquid crystal display 203 through a liquid crystal driver 202, thereby allowing a desired image surface to be displayed by the display 203. On the other hand, all of the key inputs are controlled by the I/O port 206. Ordinarily, the key depressed by the key scan which is generally executed is detected and the detected key data is input from the I/O port 206 to the CPU 22 through a receiver 208.

Area Designating Procedure

An area designating method of the invention will now be described hereinbelow with reference to the drawings.

In the area designation of the embodiment, there are provided three operating modes: a trimming mode to form the image obtained by extracting the image in the designated area; a masking mode to form the image obtained by deleting the image in the designated area; and a partial processing mode for executing different processings to both of the inside and outside images of the designated area and for forming the image. The operator can select a desired mode. On the other hand, in each mode, a plurality of areas can be designated.

Figure 6:
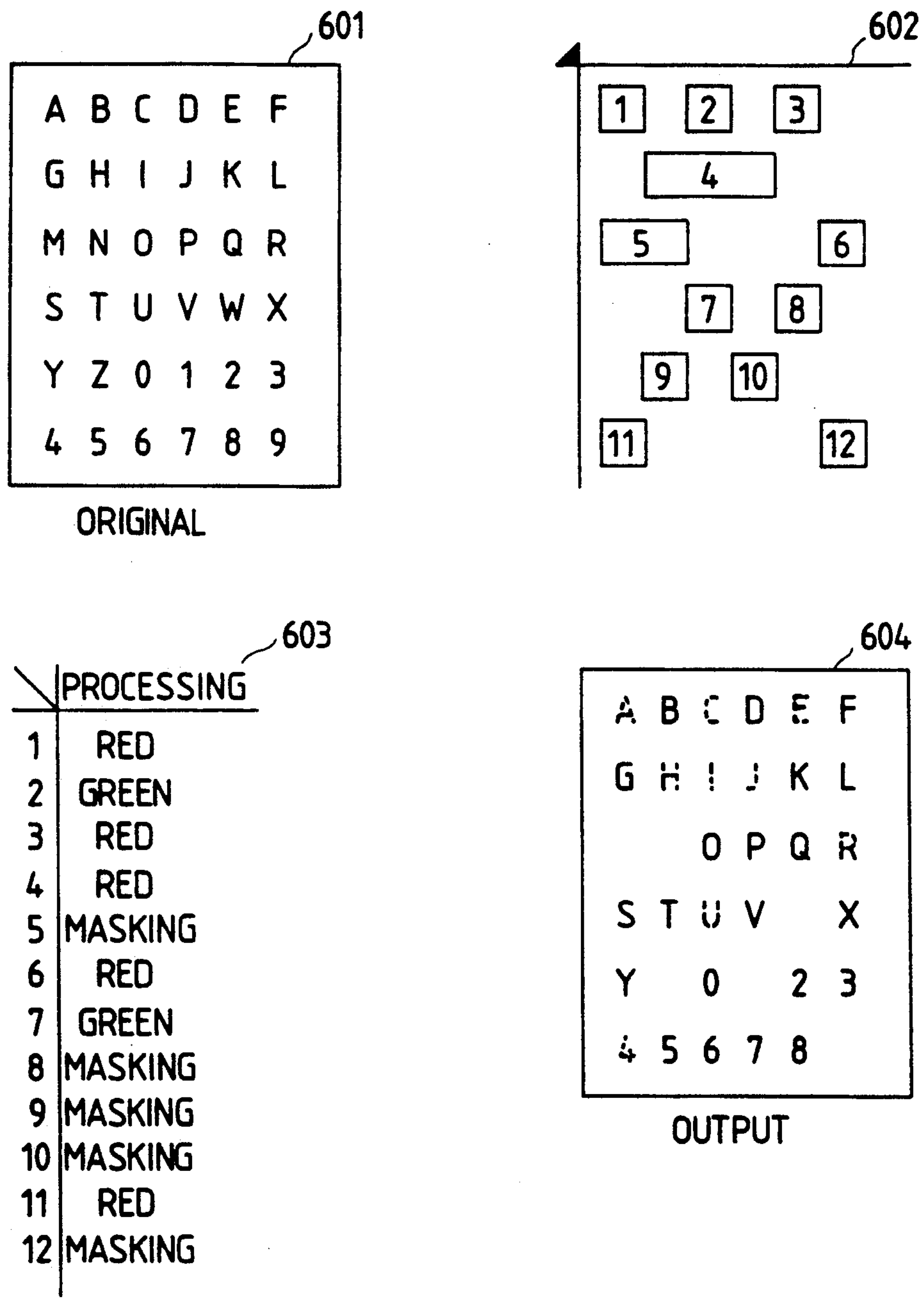
FIG. 6 is a diagram showing a state of an original area designation output.

Consideration will now be made with respect to a procedure such that for an original 601 as shown in FIG. 6, the color is partially changed to red or green or the image area is partially masked in the partial processing mode and an output as shown by 604 is obtained. For area designation, the coordinates as shown by 602 and the contents to be processed which are indicated by 603 are input.

Figure 7:
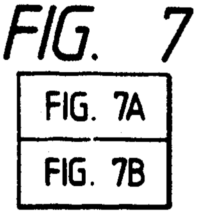
FIG. 7 consists of FIGS. 7A and 7B; which are diagrams showing the display upon operation.
Figure 7A:
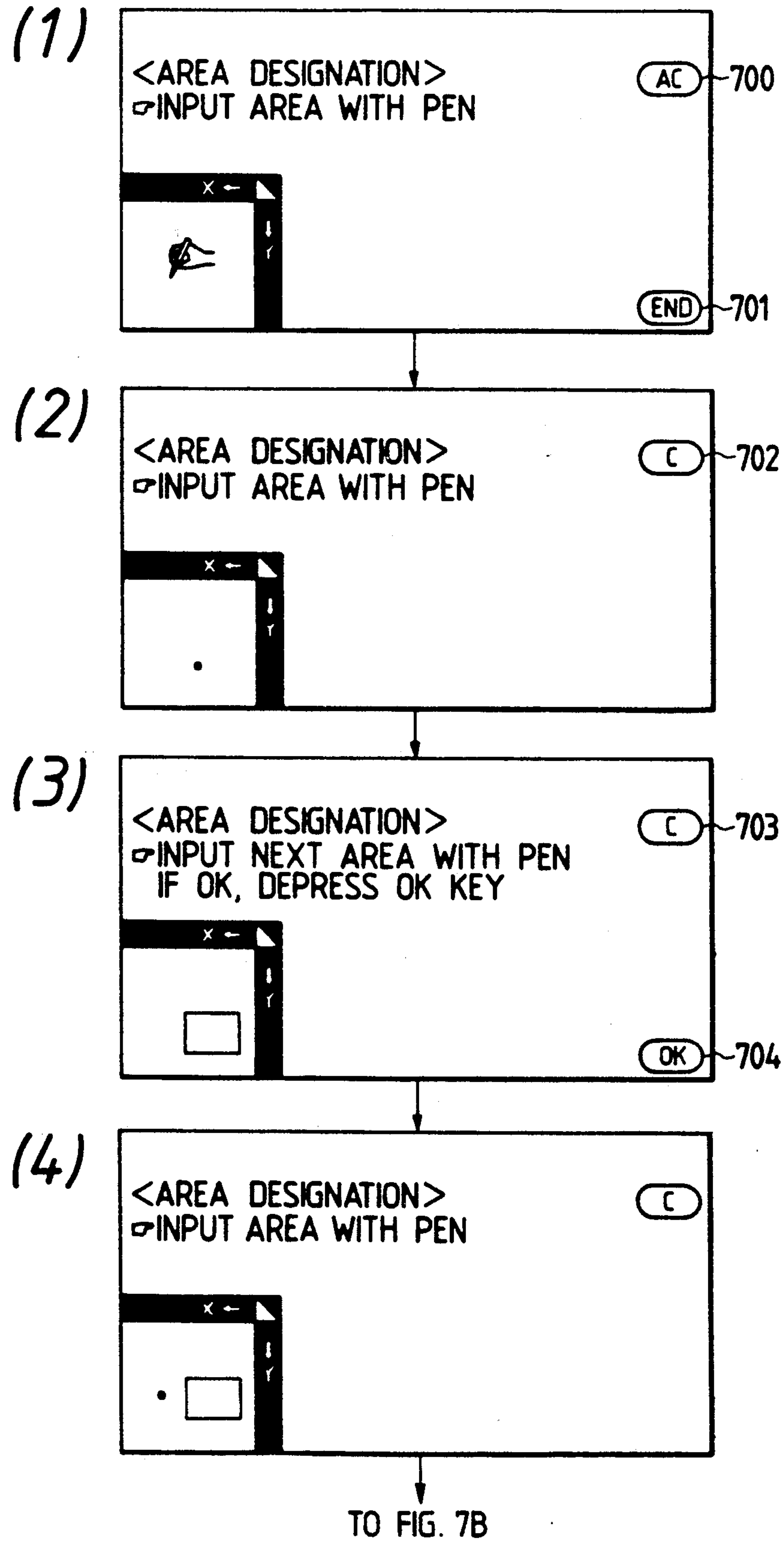

First, the reset key 401 is depressed to initialize the apparatus. Then, by depressing the entry key 424 in the area designating mode, the liquid crystal display 405 on the operating section displays an image surface as shown in FIG. 7A(1).

The original 601 is put at a reference position of the coordinate detecting plate 420 and two points on a diagonal line of an objective area are input with the point pen 421. After one point was input, the liquid crystal display (hereinafter, simply referred to as an LCD) 405 displays an image surface such that the point is displayed at the position corresponding to the designated position of the original as shown in FIG. 7A(2). When one point is further input, the LCD 405 displays an image surface such that a rectangle corresponding to the size and position of the designated area is graphically displayed as shown in FIG. 7A(3). If the input area is improper at each of the above time points, by depressing clear keys 702 and 703, the image surface is returned to the image surface of FIG. 7A(1) and the apparatus is set to the mode to wait for the area input again.

Figure 7B:
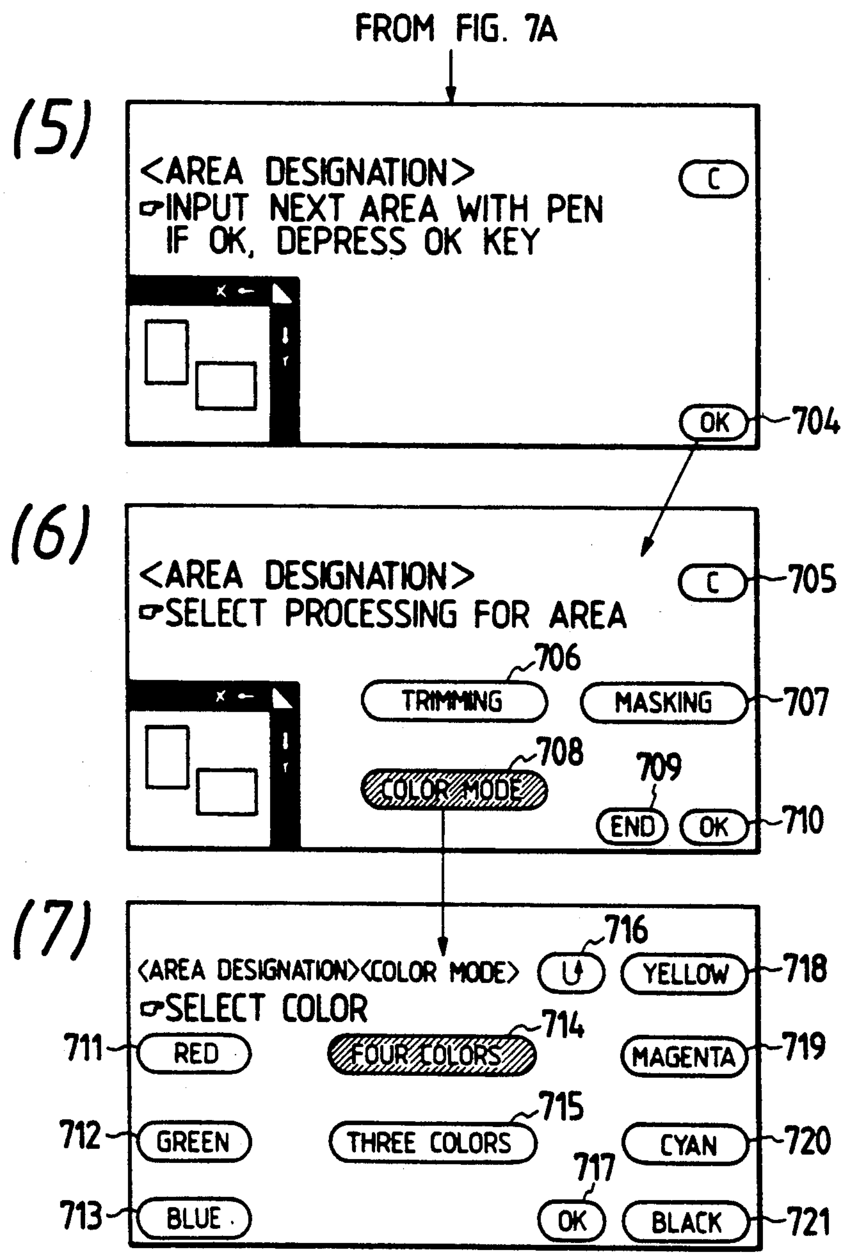

If the input area is proper, the coordinates of another area are further subsequently input. When one point of the coordinates of the area is input, an image surface as shown in FIG. 7A(4) is displayed. When another point is input, both of the area which had already been designated and the area which has newly been designated are displayed as shown in FIG. 7B(5). When five areas of Nos. 1, 3, 4, 6, and 11 shown in 602 and 603 in FIG. 6 are input by repeating the above procedure, five rectangles are displayed by the LCD 405. By depressing an OK key 704 during the display, the image surface is changed as shown in FIG. 7B(6). To change the portions in the five areas which were input by the above procedure to red by the partial processing, a touch key 708 on the image surface of FIG. 7B(6) is depressed to select the color mode. Thus, the image surface changes as shown in FIG. 7B(7) and the red mode is selected by depressing a touch key 711. By finally depressing an OK key 717, the mode is stored and the image surface is returned to that of FIG. 7A(1) and the setting of the five areas is completed. The other two areas which are changed to green are also processed and set by executing the similar procedure. With respect to the remaining five areas which are set into the masking mode, in a state in which the coordinates of the five areas were completely input and the image surface is as shown in FIG. 7B(6), a touch key 707 is depressed to designate the masking mode. By subsequently depressing a touch key 709, all of the setting operations are completed.

The other portions of the original are image formed in a preset mode, for instance, in a full color mode of four colors.

Figure 8:
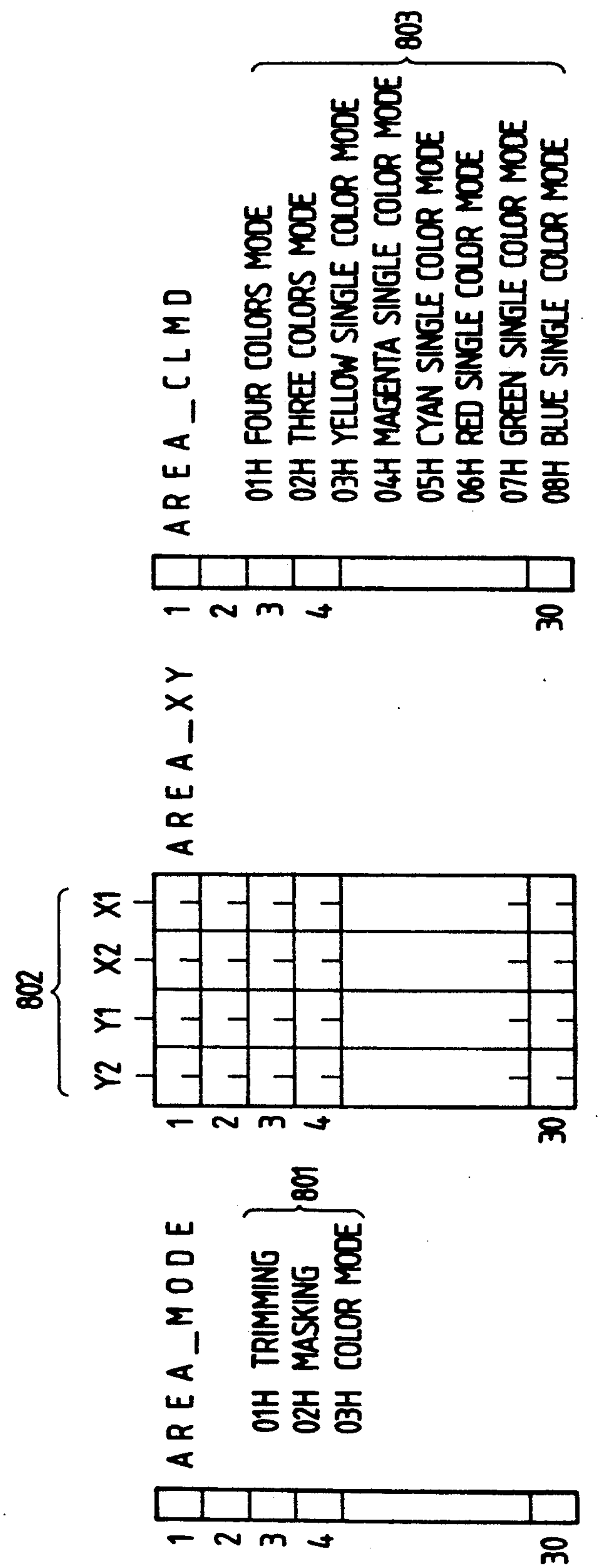
FIG. 8 is a diagram showing memory maps of areas.

The CPU 22 has a table to store the area data in the RAM 24 in order to execute the different image processing every area. FIG. 8 is a diagram showing a memory table of the area data. In the embodiment, thirty areas can be designated.

The contents to be processed in the area, for instance, as shown by 801, the information of the trimming, masking, and color mode are recorded in AREA MODE. The coordinate values $X_1$, $X_2$, $Y_1$, and $Y_2$ of two edge points on a diagonal line of the area are stored in AREA XY as shown by 802. AREA CLMD is referred only in the case where the color mode was stored in AREA MODE corresponding to the area. One of the modes shown by 803 as contents to be processed is stored.

In the construction as mentioned above, an algorithm to continuously input a plurality of same processing areas mentioned above will now be described with reference to a flowchart of FIG. 1.

First, when the entry key 424 of the area designating mode is depressed, 1 is stored into memory sections a and b provided in the RAM 24 (step S100). a indicates the present area number and b indicates a start number of the area which is displayed in the display section 405. If the processing mode has already been stored in the area of No. a, the area is displayed in the display section 405 (S106). If no processing mode is stored, the apparatus waits until the coordinate values are input from the digitizer. If the coordinate values of one area have been input (S102), the area of No. a is additionally displayed by the LCD (S103). Further, in the case of inputting the coordinates of the next area (S104), 1 is added to a (S105). As shown in FIGS. 7A(3) and 7B(5), the apparatus again waits for the input from the digitizer (S102). If the OK key 704 is depressed and the input of the coordinate values of the area is finished, all of the registration areas of Nos. 1 to a are displayed on the LCD 405 and, as shown in FIG. 7B(6), the apparatus waits until the contents to be processed are input (S108). Upon input of the coordinate vlaues in step S102, the input coordinate values are stored into the AREA XY (in FIG. 8) corresponding to the area a.

When the contents to be processed are selected (S108) and the parameters necessary for the processing are further input (S109), the selected processing mode and parameters are stored into the AREA MODE and AREA CLMD corresponding to a plurality of areas which are subjected to the same processing. Next, a check is made to see if an area which is executed to another processing is registered or not by discriminating whether an OK key 710 (or 717) has been depressed or not (S110). If the OK key has been depressed, 1 is added into a to register the next area (S111). a is substituted for b to store the first number of the area which is subjected to another processing (S112). The processing routine is returned to step S101 and the processing to register the next area is executed.

When the area which is subjected to another processing is input, the area and the contents to be processed which have been displayed so far by the display 405 are deleted from the display 405.

On the other hand, if there is no need to register the area which is subjected to another processing, the area designating processing is finished by depressing the end key 709.

If the contents to be processed for the area of No. a have already been stored in step S101, the area and the contents to be processed can be checked and changed. That is, the area of No. a and the contents to be processed are displayed by the display 405 (S106). A check is made to see if the contents to be processed are changed or not by discriminating whether a clear key 705 has been depressed or not (S107). When the clear key 705 has been depressed, the contents to be processed are changed in steps S108 and S109. A check is then made to see if the checking and changing operations of the processing of the area are executed or not by discriminating whether the OK key 710 has been depressed or not (S110). If the OK key 710 has been depressed, 1 is added to a and a is substituted for b (S111, S112). Due to this, the contents to be processed can be registered in a lump for a plurality of areas which are subjected to the same processing. On the other hand, since the checking and changing operations of the processing can be executed every area, a part of the areas can be easily changed.

Figure 9:
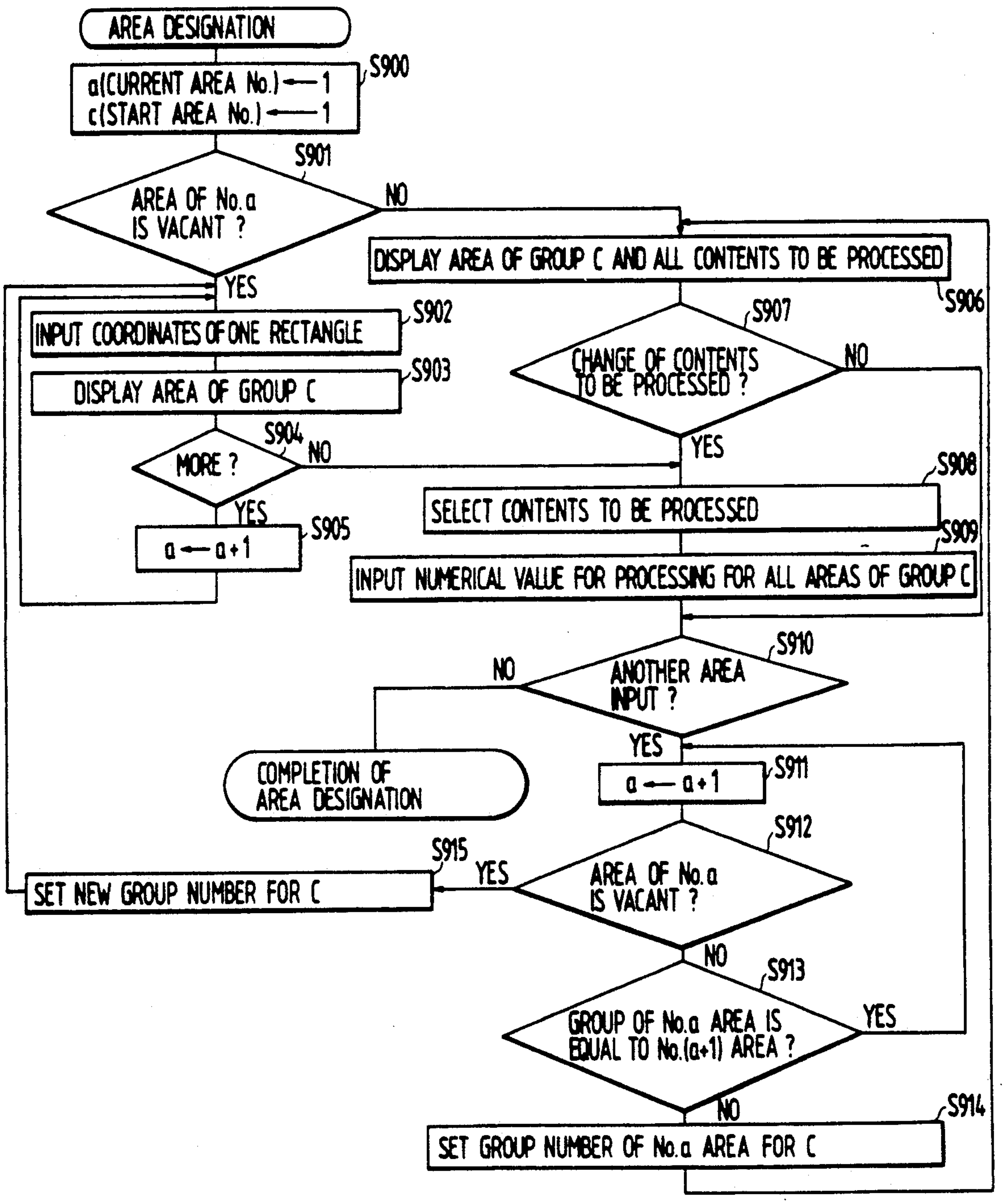
FIG. 9 is a flowchart for an algorithm in the second embodiment.
Figure 10:
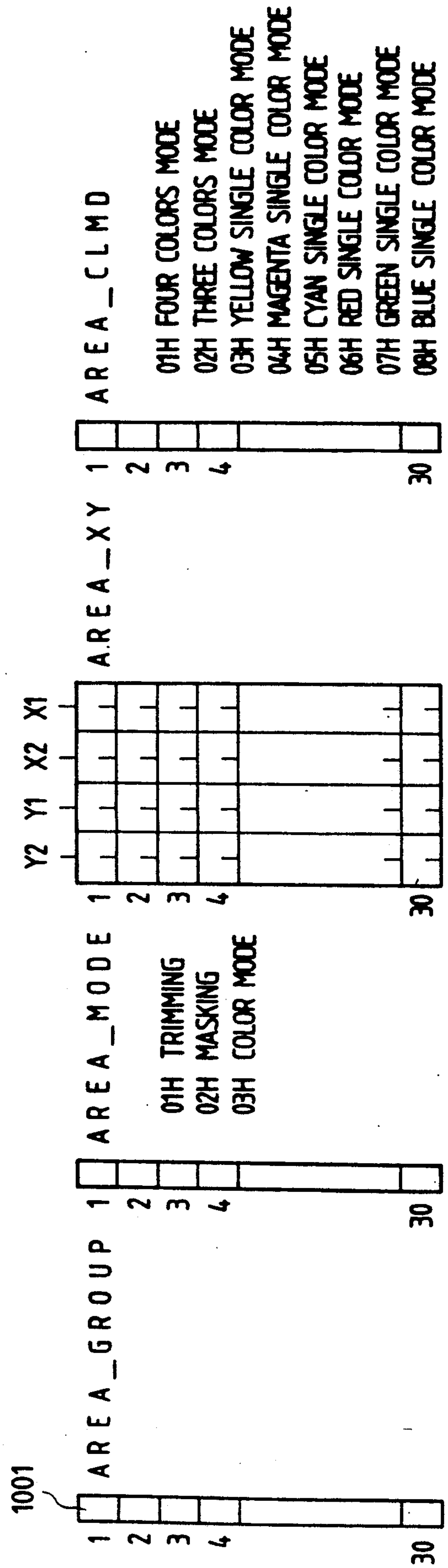
FIG. 10 is a diagram showing memory maps of areas in the second embodiment.

The second embodiment of the invention will now be described with reference to FIGS. 9 and 10. In the embodiment, the inputting operation of a plurality of areas which are subjected to the same processing and the checking and changing operations of the contents to be processed will be described.

The area registration is executed in steps S900 to S905 in a manner similar to steps S100 to S105 in FIG. 1. In step S900, C indicates the group number of the areas which are subjected to the same processing. In S903, the area which has newly been input is displayed together with the areas of the same group which had already been registered. At this time, the group number is stored in AREA GROUP in the RAMs 24 and 25 in FIG. 10 and the coordinates of the designated area are stored into the AREA XY. Upon completion of the input of the areas which are subjected to the same processing, the contents to be processed and the parameters are stored into the AREA MODE and AREA CLMD in steps S908 and S909 in a manner similar to steps S108 and S109. A check is made to see if the areas of the group which are subjected to another processing are registered or not in step S910 in a manner similar to step S110. If the OK key has been depressed, 1 is added to a in order to input the areas of the group which are subjected to another processing (S911). If the area of No. a is not registered yet, the new group number is stored into C (S915). The apparatus waits until the coordinates are input. On the other hand, in the case of checking and changing the area and the contents to be processed, all of the areas which belong to the group C and the contents to be processed are displayed by the display 405 (S906). A check is made to see if the contents to be processed are changed or not in step S907 in a manner similar to step S107. In steps S908 and S909, the contents to be processed and the parameters are changed. At this time, the contents to be processed and the parameters for all of the areas of the same group are changed. On the other hand, in the case of checking and changing the areas of another group and the contents to be processed, it is checked in step S910 in a manner similar to step S110. 1 is added to a in step S911. A check is made in steps S912 and S913 to see if the group of the areas of No. a and the group of the areas of No. (a−1) are equal or not. If they are equal, this means that those areas and the contents to be processed have already been displayed. Therefore, 1 is further added to a (S911). The new group of the areas of No. a and the group of the areas of No. (a−1) are compared. If the group numbers differ, the group number of the areas which belong to No. a is substituted for C (S914). All of the areas of the group C and the contents to be processed are displayed. When the areas of another group are displayed, the areas of the groups and the contents to be processed which have been displayed so far are deleted from the display.

Due to this, the contents to be processed for the areas which are subjected to the same processing can be checked and changed in a lump.

The inputting order of the coordinate values and the inputting order of the contents to be processed may be reversed.

As described above, the coordinates of a plurality of areas which are subjected to the same processing can be continuously input and the contents to be processed for a plurality of areas can be designated in a lump. Further, all of the areas which are subjected to the same processing are displayed. Therefore, even if the number of areas increases, an erroneous designation of the contents to be processed can be eliminated and the areas and the contents to be processed can be smoothly designated.

The image of the original which was read is processed by the video processing unit 12 in accordance with the contents to be processed for the areas designated as mentioned above and the processed image signal is output as a digital image signal to the printer 2 every color of magenta, cyan, yellow, and black.

A color image is formed on a recording paper by the printer 2 in accordance with the digital image signal per color.

What is claimed is:

1. An image editing apparatus comprising:

first designating means for designating a desired area of an original;

second designating means for designating a processing mode to an image of the area which is designated by the first designating means, said second designating means being capable of designating a different respective processing mode to each area;

display means for displaying the area designated by the first designating means; and control means for allowing a plurality of areas which are designated by the first designating means to be displayed by the display means and for allowing the second designating means to designate the same processing mode to the plurality of areas displayed by the display means without that processing mode being designated repeatedly by the second designating means to the designated areas.

2. An apparatus according to claim 1, wherein the display means displays a graphical pattern representing a position of the area designated by the first designating means.

3. An apparatus according to claim 1, wherein said second designating means designates a mode regarding a color.

4. An apparatus according to claim 1, further comprising:

third designating means for designating a processing mode for the image other than the area designated by the first designating means.

5. A method of setting an image processing mode, comprising the steps of:

inputting data indicative of a plurality of desired areas of an original;

displaying the areas in response to input of the data of each of the areas; and designating the same processing mode for the images of a plurality of areas displayed, without repeating designation of the same processing mode to the designated areas, and for designating an image processing mode to an area other than the areas input in said inputting step.

6. A method according to claim 5, wherein, in said inputting step, coordinate data of the areas are input.

7. A method according to claim 6, wherein said inputting step further comprises a step of storing the input coordinate data.

8. A method according to claim 5, wherein, in said displaying step, a plurality of areas to which the same processing mode is designated are displayed.

9. A method according to claim 5, wherein, in said displaying step, a graphical pattern representing a position of the designated area is graphically displayed.

10. A method according to claim 5, wherein, in said designating step, the processing mode regarding a color is designated.

11. A method according to claim 5, further comprising the step of forming images of the plurality of input areas on a recording medium in accordance with the designated processing mode.

12. A method of setting an image processing mode, comprising:

a first area designating step of designating a plurality of areas of an original which are to be subjected to the same image processing;

a first mode designating step of designating an image processing mode for the images of the plurality of areas designated in said first area designating step, without repeating designation of the same image processing mode to the respective areas;

a second area designating step of designating a plurality of areas to which an image processing mode different from the image processing mode designated in said first mode designating step is set;

a second designating step of designating an image processing mode for the images of the plurality of areas designated in said second area designating step, without repeating designation of the same image processing mode to the respective areas; and a third mode designating step of designating an image processing mode for the images of the portions other than the areas designated in said first step designating step and said second area designating step.

13. A method according to claim 12, further comprising a first displaying step of displaying the plurality of areas designated in the first area designating step.

14. A method according to claim 13, wherein, in said first displaying step, graphical patterns representing positions of the designated areas are displayed.

15. A method according to claim 12, wherein in said first mode designating step, the processing mode regarding a color is designated.

16. An image setting apparatus comprising:

a first designator for designating a desired area of an original;

a second designator for designating an image processing mode to an image of the area designated by said first designator, said second designator being capable of designating a different image processing mode for each area; and a controller for causing said second designator to designate the same image processing mode to a plurality of areas designated by said first designator, without the same processing mode being designated repeatedly to the respective designated areas by said second designator.

17. An image editing apparatus according to claim 16, wherein said second designator designates a mode concerning color.

18. An image editing apparatus according to claim 16, wherein said second designator can respectively designate different image processing modes to an area designated by said first designator and an area other than the designated area.

19. A method of setting an image processing mode, comprising the steps of:

a first designating step of designating a plurality of desired areas of an original;

a second designating step of designating the same image processing mode to images of the plurality of areas designated in said first designating step, without repeating designation of the same image processing mode to the respective designated areas; and a third designating step of designating an image processing mode different from the image processing mode designated in said second designating step, to an area different from the area designated in said first designating step.

20. A method of setting an image processing mode according to claim 19, wherein, in said second designating step, an image processing mode concerning color is designated.

* * * * *

UNITED STATES PATENT AND TRADEMARK OFFICE

CERTIFICATE OF CORRECTION

PATENT NO. : 5,079,625

DATED : January 7, 1992

INVENTOR(S) : TOSHIYUKI KITAMURA, ET AL.

It is certified that error appears in the above-identified patent and that said Letters Patent is hereby corrected as shown below:

ON THE TITLE PAGE

IN [76] INVENTORS

"Yamayoshibiru" should read --Tokyo--.

COLUMN 1

Line 24, "U.S. Pat. No. 4,873,520." should read --U.S. Pat. No. 4,873,570.--.
Line 51, "and" should be deleted.

COLUMN 2

Line 1, "7B;" should read --7B,--.

COLUMN 5

Line 47, "into" should read --to--.

COLUMN 8

Line 33, "second designating step" should read --second mode designating step--.
Line 40, "first step" should read --first area--.
Line 49, "wherein" should read --wherein,--.

UNITED STATES PATENT AND TRADEMARK OFFICE
CERTIFICATE OF CORRECTION

PATENT NO. : 5,079,625

DATED : January 7, 1992

INVENTOR(S) : TOSHIYUKI KITAMURA, ET AL.

It is certified that error appears in the above-identified patent and that said Letters Patent is hereby corrected as shown below:

COLUMN 8

Line 52, "image setting apparatus" should read --image editing apparatus--.

Signed and Sealed this

Eighth Day of June, 1993

Attest:

Michael K. Kirk

MICHAEL K. KIRK

Attesting Officer

*Acting Commissioner of Patents and Trademarks*